US008873589B2

(12) United States Patent
Aweya et al.

(10) Patent No.: US 8,873,589 B2
(45) Date of Patent: Oct. 28, 2014

(54) METHODS AND DEVICES FOR CLOCK SYNCHRONIZATION

(75) Inventors: James Aweya, Abu Dhabi (AE); Nayef AlSindi, Abu Dhabi (AE)

(73) Assignees: Khalifa University of Science, Technology and Research, Abu Dhabi (AE); British Telecommunications plc, London (GB); Emirates Telecommunications Corporation, Abu Dhabi (AE)

( * ) Notice: Subject to any disclaimer, the term of this patent is extended or adjusted under 35 U.S.C. 154(b) by 97 days.

(21) Appl. No.: 13/602,582

(22) Filed: Sep. 4, 2012

(65) Prior Publication Data

US 2014/0064303 A1    Mar. 6, 2014

(51) Int. Cl.
*H04L 7/04* (2006.01)

(52) U.S. Cl.
USPC ............ 370/509; 370/503; 370/516; 370/517

(58) Field of Classification Search
CPC ..................... H04L 2027/0026; H04L 7/0012; H04L 7/0025; G05B 2919/2228; G05B 2919/25049; G05B 2919/25048
USPC ......... 370/509, 503, 507, 512, 516, 517, 518, 370/519
See application file for complete search history.

(56) References Cited

U.S. PATENT DOCUMENTS

| 6,327,274 | B1 | 12/2001 | Ravikanth |
| 6,661,810 | B1 | 12/2003 | Skelly et al. |
| 6,957,357 | B2 | 10/2005 | Liu et al. |
| 7,051,246 | B2 | 5/2006 | Benesty |
| 7,688,865 | B2 | 3/2010 | Carlson et al. |
| 2004/0057379 | A1* | 3/2004 | Chen et al. .................... 370/235 |
| 2010/0158183 | A1 | 6/2010 | Hadzic et al. |
| 2013/0080817 | A1* | 3/2013 | Mihelic ........................ 713/401 |

OTHER PUBLICATIONS

IEEE Standard for a Precision Clock Synchronization Protocol for Networked Measurement and Control Systems, IEEE 1588-2008.
IEEE Standard for a Precision Clock Synchronization Protocol for Networked Measurement and Control Systems, IEEE 1588-2002.
Mills, D., "Network Time Protocol (Version 3) Specification, Implementation and Analysis", IETF RFC 1305, Mar. 1992.
R. Holler, T. Saulter, N. Kero, "Embedded SynUTC and IEEE 1588 clock synchronization for industrial Ethernet," in Proc. IEEE Emerging Technologies and Factory Automation, vol. 1, pp. 422-426, Nov. 2003.

(Continued)

*Primary Examiner* — Mark Rinehart
*Assistant Examiner* — Ellen A Kirillova
(74) *Attorney, Agent, or Firm* — Calfee, Halter & Griswold LLP

(57) ABSTRACT

This invention relates to methods and devices for clock synchronization. The invention makes particular use of IEEE 1588 with offset and skew correction. In embodiments of the invention, the IEEE 1588 Precision Time Protocol is used to exchange time stamps between a time server and a client from which the client can estimate the clock offset and skew. In embodiments of the invention a free running clock at the client is provided with an estimation technique based on the time stamps from the IEEE 1588 PTP message exchange between the server and client clocks. The offset and skew from the estimation process can be combined with the local free running clock to give a synchronized local clock which is an accurate image of the master clock.

28 Claims, 7 Drawing Sheets

(56) References Cited

OTHER PUBLICATIONS

O. Gurewitz, I. Cidon and M. Sidi, "Network time synchronization using clock offset optimization," in Proc. IEEE Intl Conf. on Network Protocols, pp. 212-221, Nov. 2003.

R. Subrahmanyan, "Timing recovery for IEEE 1588 applications in telecommunications," IEEE Transactions on Inst. And Meas., vol. 58, No. 6, pp. 1858-1868, Jun. 2009.

I. Hadzic, D.R. Morgan and Z. Sayeed, "A synchronization algorithm for packet MANs," IEEE Transactions on Communications, vol. 59, No. 4, pp. 1142-1153, Apr. 2011.

V. Paxon, Measurements and Analysis of End-to-End Internet Dynamics, Ph.D. Thesis, University of California, Berkeley, 1997.

S. B. Moon, P. Skelly and D. Towsley, "Estimation and removal of clock skew from network delay measurements," in Proc. IEEE INFOCOM, vol. 1, pp. 227-234, New York, NY, USA, Mar. 1999.

L. Zhang, Z. Liu and C. H. Xia, "Clock synchronization algorithms for network measurements," in Proc. IEEE INFOCOM, vol. 1, pp. 160-169, Nov. 2002.

Kyoung-Lae Noh et al. "Adaptive multi-hop timings synchronization for wireless sensor networks" Signal Processing and its Applications 2007, ISSPA 2007, 9th International Symposium on, IEEE, Piscataway NJ USA, Feb. 12, 2007, pp. 1-6.

Paolo Ferrari et al. "IEEE 1588-Based Synchronization System for a Displacement Sensor Network" IEEE Transactions on Instrumentation and Measurement, IEEE Service Center, Piscataway, NJ, USA, vol. 56, No. 2, Feb. 1, 2008, pp. 254-260.

\* cited by examiner

METHODS AND DEVICES FOR CLOCK SYNCHRONIZATION

FIELD OF THE INVENTION

The present invention relates to methods and devices for clock synchronization. It is particularly, but not exclusively, concerned with the alignment of slave clocks to a master clock using IEEE 1588 PTP with offset and skew correction.

BACKGROUND OF THE INVENTION

IEEE 1588 PTP [1][2] is now one of the industry accepted protocols for delivering high accuracy time services in the sub-microseconds levels. IEEE 1588 PTP is similar in concept to the Network Time Protocol (NTP) [3]. Both protocols distribute time messages over a packet network to time clients. NTP is ubiquitous and operates at the upper layers of the protocol stack and in its current form provides no better than millisecond levels accuracy. IEEE 1588 PTP is a layer 2 protocol (although it can also be made to operate over higher protocol layers) with hardware timestamping capabilities to provide sub-microsecond accuracy. As a packet-based high accuracy synchronization protocol, IEEE 1588 PTP certainly has a number of advantages over GPS, which until now was the only available solution for high quality time synchronization.

GPS based satellite receivers 16 provide sub-100 nanosecond accuracies, and are often used where precision time synchronization is mission critical: in telecommunication, military, and aerospace applications. But improved accuracy comes at a cost. GPS receivers used for telecom networks synchronization have a much higher specification (high quality oscillators, high holdover capability accuracies, etc.) than those in the average portable satellite navigation system, plus they need all the correct interfaces and cabling to communicate with the telecoms equipment. GPS based systems require outdoor antenna installations to assure a direct view of the sky to receive the low power satellite transmissions, which are not only an added expense but which create an extra burden on the physical infrastructure of the facility. For this reason, GPS is best suited to be used in a central location as the primary reference clock (PRC) for a telecom network with other technologies utilized to distribute synchronization and timing to remote locations.

GPS-based solutions also have poor or no reception in indoor and underground environments, and dense urban canyons where direct visibility of the GPS satellites 18 is poor thus making them not suitable for a good proportion of picocell and femtocell users. GPS is also not suitable for devices with small footprints requiring time synchronization like wireless sensors. Another concern is GPS is perceived outside the USA as an American controlled technology with no service guarantees (GPS is not autonomous), as a result its use as the primary source of timing is not favored by operators in other countries. For the above reasons, IEEE 1588 PTP has gained traction in the industry as the protocol of choice for high quality synchronization.

Clock Synchronization in Packet Networks

The need for synchronized time is critical for today's network environments. FIG. 1 shows a general view of some of the devices that require time synchronization in a packet network 12. The time transfer protocol could be NTP or IEEE 1588 PTP, but the latter is the protocol of choice for telecom networks.

There are many applications of high precision time synchronizations, some of which are emerging applications. Some notable application areas are as follows:

Mobile Networking: Synchronization is a key requirement in the telecommunications industry and this market has become a driving force in the development and evolution of synchronization solutions and standards. For example, wireless technologies like GSM, WCDMA (both frequency division duplexing (FDD) and time division duplexing (TDD) technologies), and CDMA2000 require frequency accuracy of 0.05 ppm (parts per million) at the air interface. In addition, CDMA2000 requires time synchronization at the ±3 µs level (±10 µs worst case) and WCDMA TTD mode requires accuracy of ±1.25 µs between base stations. The accurate reference clock is typically derived from Time Division Multiplexing (TDM) interfaces (for GSM, WCDMA and other FDD based technologies) or from expensive GPS receivers located at the base station (for TDD based technologies). Without synchronization traceable to a highly accurate reference clock in the wireless network, local interference between channel frequencies, as well as mutual interference with neighboring base stations will occur. This could ultimately cause calls to be dropped and a degradation of the overall user experience. The high level of synchronization provided by IEEE 1588 PTP could also be useful in time-of-arrival (TOA) and time-difference-of-arrival (TDOA) based localization solution where one is interested in locating mobile nodes connected to a wireless network.

Residential Audio/Video (A/V) Networking: Modern consumer electronics now gather, store, and transmit audio and video data in digital form and require adequate quality of service and synchronization for live streaming. The 802.1AS protocol, which is based on IEEE 1588, provides timing and synchronization within bridged home A/V Ethernet LANs. The protocol allows high level timing information to be distributed to each media playback device, thus, providing them with a precise reference point for streaming multimedia. This synchronization technology, thus, enables a convergence to Ethernet as a viable consumer electronics interconnect.

Test and Measurement: IEEE 1588 PTP was originally designed to satisfy the need for synchronization in test and measurement systems but has now become beneficial in other areas. The challenge was to synchronize networked measuring devices with each other in terms of time so that they are able to record measured values and provide them with a precise system timestamp. Based on this timestamp, the measured values can then be correlated with each other.

Industrial Automation: The major uses of high precision synchronization within an industrial automation and motion-control environment are for sequencing event measurements, scheduling outputs, synchronizing actuation, timestamping logged data and coordinating events with a GPS level accuracies. Multi-stand printing presses which operate at very high speeds require a very high level of synchronization. By distributing highly precise timing information to each subsystem, a common point of reference can be used to coordinate their activities—each manufacturing component has a precise time reference to begin or end their associated actions.

Other application areas include synchronization of sensors and sensor network, power systems, ranging, telemetry and navigation systems. Synchronization is also needed in other areas, though the level of accurate may not be as high as in the application areas cited above. Some general applications of synchronized time services are as follows:

Wireless sensor networks (WSNs): WSNs have a wide range of applications including the monitoring of the status of industrial processes and equipment, environmental monitoring, infrastructure monitoring, surveillance, tracking, etc. But the efficient operation of a WSN depends on how well the various nodes are time synchronized. Time synchronization allows for the coordination among the nodes for power saving sleep/wake up modes, localization of sensor nodes and other sources, data fusion, object tracking, transmission scheduling among the nodes, and distributed communication and processing of data.

Billing services: Billing services and similar applications must know the time accurately. Time based billing as in telecom networks rely on time synchronization. Mobile user billing and maintenance functions also rely on precise timing references.

Log file accuracy, auditing, and monitoring: Tracking security breaches, network usage, or problems affecting a large number of components can be nearly impossible if timestamps in logs are inaccurate.

Network fault diagnosis and recovery: Every aspect of managing, securing, planning, and debugging a network involves determining when events happen. Without time synchronization, it can be difficult or impossible to correlate the time sequence of events involving multiple network components, such as outages, bugs, security breaches, service problems, or network problems. Precise timestamping of data events through each element in the backhaul network facilitates the isolation and traceability of failures and outages.

File timestamps: To reduce confusion in shared filesystems, it is crucial for the modification times to be consistent, regardless of what machine the filesystems are on. Sorting email and other network communications can also be difficult if timestamps are incorrect.

Access security and authentication (e.g., Kerberos): Many security and authentication protocols require accurate time synchronization. Applications such as cyptographic key management and secure document transmission may require using accurate, encoded timestamps which match unencoded time stamps to help assure document authenticity.

Real-world time values (e.g., correlation of events at different locations): In addition, interactions with dynamic events such as stock market trades, aviation management, and radio and TV programming, require careful synchronization of time among the various players in the system.

Validation of e-commerce transactions (e.g., electronic payments, electronic stock transfers): Some financial services even require highly accurate timekeeping by law.

Directory services (e.g., Active Directory, etc.)
Distributed computing
Scheduled operations (e.g., cron jobs, network backups)
Network forensics The following basic definitions will be used throughout this specification:

Clock Offset: The clock offset at a particular moment is the difference between the time reported by the time client (slave) and the "true" time as reported by the time server (master).

Clock Skew: A clock's skew at a particular moment is the frequency difference (first derivative of its offset with respect to true time) between the client clock and the server clock.

Clock synchronization has received considerable attention over the last several years as the communication networks evolve from circuit-switched to all-IP packet based networks. With this migration the challenge of frequency and time synchronization has surfaced. The techniques in the state of the art differ by the assumed model and the estimated parameters.

The first group assumes that the two clocks differ by an offset. As a result the algorithms and techniques attempt to estimate only the offset between the clocks. The reality is far from this model, however, and as a result the second group adopts a more realistic model where the clocks differ by an offset and a skew. The skew is assumed constant in the duration of the estimation process. In order to achieve robust and accurate synchronization, advanced algorithms are needed that estimate the offset and skew simultaneously.

Clock synchronization over packet networks (LANs) but with the offset only assumption has been proposed in [4] and [5]. The former implements offset estimation using IEEE 1588 protocol which is more accurate than the latter that uses the Network Time Protocol (NTP)—which is software-based, inaccurate time-stamping method.

The importance of clock synchronization in telecommunication networks has been highlighted in [6] where a phase control loop has been proposed using the IEEE 1588 PTP protocol to estimate the offset. Another recent offset-only clock synchronization algorithm has been proposed in [7] which follows [6] in concept where the PTP algorithm is used as the timestamp exchange mechanism and a PLL is implemented to estimate the offset. In addition the authors propose noise reduction mechanisms to deal with Packet Delay Variation (PDV) noise typically experienced in packet networks.

The problem with all these techniques is the non-realistic assumption that the two clocks differ only by an offset. The reality however is that the slave clock, in addition to the offset, deviates in time as well due to the skew problem which is an inherent problem with most clocks. As a result in order to enable robust and accurate synchronization both the offset and the skew should be estimated.

There are several techniques that propose clock synchronization algorithms to estimate the skew through linear regression or linear programming techniques and convex hull methods.

Specifically, [8] proposes a median line-fitting technique which is a robust line-fitting technique. The problem with line-regression algorithms is that they are usually not robust to presence of large outliers and thus the robustness is only valid for certain PDV models (e.g. Gaussian).

In [9] a simple skew and offset estimation method is proposed where timestamps are used to compute the average jitter and average inter-packet arrival time. Then the relative skew is computed as the ratio of the average jitter to the average inter-packet time.

A more complicated approach is proposed in [10] [11] where a linear programming technique is used to estimate the clock skew in network delay measurements. The technique shows improvement in performance compared to other existing algorithms.

In [12] [13] skew estimation is achieved through the computation of convex hull from the delay measurements. The authors claim that convex-hull approach provides better insight and handling of error metrics compared to linear regression or linear programming techniques. Although the technique was tested using NTP, it can be implemented with any protocol (such as IEEE 1588) that captures the delay measurements.

An extension of this technique is introduced by [14] where both the offsets and skew are estimated by a lower and upper convex hull approach that relies on using forward/backward delay measurements.

An adaptive approach to estimating the clock skew was proposed in [15] where a recursive least squares approach is used to calculate an estimate of the clock skew.

One major drawback of these techniques is that they have been developed using NTP messaging mechanisms which does not have high accuracy. For very precise clock synchronization applications such as synchronizing TDD base stations over packet network a more robust approach is required that integrates IEEE 1588 protocol.

IEEE 1588 Precision Timing Protocol (PTP)

IEEE 1588 PTP was defined [1][2] to synchronize distributed clocks across Ethernet and other packet based networks. It allows for synchronization of distributed clocks to sub-microsecond accuracy. IEEE 1588 PTP was designed as an improvement to current time synchronization technologies such as the network time protocol (NTP) [2]. NTP allows for synchronization of distributed clocks to a precision in the order of hundreds of microseconds or milliseconds, which for many applications such as those for personal computing purposes is a sufficient level of accuracy. IEEE 1588 PTP, which is now the industry accepted standard for synchronization, grew out of the need for greater accuracy synchronization over packet networks, particularly Ethernet.

IEEE 1588 PTP relies on the use of hardware timestamped messages to synchronize one or more slave clocks (time client) to a master clock (time server). This process involves a message transaction between the master and slave where the precise moments of transmit and receive are measured, preferably at the hardware level. Accurate time information is distributed hierarchically, with a grandmaster clock at the root of the hierarchy. The grandmaster provides the time reference for one or more slave devices. These slave devices can, in turn, act as master devices for further hierarchical layers of slave devices.

IEEE 1588 PTP also defines the descriptors that characterize a clock, the states of a clock and the allowed state transitions. The standard defines network messages, fields and semantics, the datasets maintained by each clock and the actions and timing for all IEEE 1588 network and internal events. In addition, the standard describes a suite of messages used for monitoring the system, specifications for an Ethernet-based implementation and conformance requirements and some implementation suggestions.

IEEE 1588 PTP relies on the transfer of PTP messages to determine clock and system properties and to convey time information. A delay measurement process is used to determine path delays, which are then accounted for in the adjustment of local clocks. At system start up, a master/slave hierarchy is created using the Best Master Clock (BMC) algorithm [1] to determine which clock has the highest quality clock (grandmaster clock) within the network. The BMC algorithm is then run continuously to allow clocks to adjust quickly to changes in network configuration and status. If the grandmaster clock is removed from the network or is determined by the BMC algorithm to no longer be the highest quality clock, the algorithm then redefines what the new grandmaster clock is and all other clocks are adjusted accordingly.

Synchronization with IEEE 1588 PTP is achieved using a series of message transactions between a master and its slaves. FIG. 2 shows the message flow process for a strictly peer-to-peer message transaction scenario. This figure illustrates the case where the master clock in a time server 10 is directly attached (or peered) to a slave clock in a time client 14 over a packet network 12. The slave clock derives its timing from the upstream master clock and then acts as a master clock for further downstream devices. The main time synchronization related message types for this exchange involve the Sync, Follow_Up, Delay-Req, and Delay_Resp messages. Other more complex message flow process where messages traverse intermediate nodes are described in the IEEE 1588 PTP standard.

In FIG. 2, the master sends a Sync message to the slave and notes the time, $T_1$, at which it was sent. The slave receives the Sync message and notes the time of reception, $T_2$. The master conveys to the slave the timestamp $T_1$ by either embedding the timestamp $T_1$ in the Sync message (i.e., one-step clock mode which requires some sort of hardware processing for embedding the timestamp on-the-fly for highest accuracy and precision), or embedding the timestamp $T_1$ in a Follow_Up message (i.e., two-step clock mode). The slave sends a Delay_Req message to the master and notes the time, $T_3$ at which it was sent. The master receives the Delay_Req message and notes the time of reception, $T_4$. The master conveys to the slave the timestamp $T_4$ by embedding it in a Delay_Resp message. The use of Follow_Up messages eliminates the need to timestamp transmitted messages on the fly, thereby facilitating a simpler hardware implementation.

After this message exchange the slave will have four timestamps $\{T_1, T_2, T_3, T_4\}$ from which it can determined both the network delay, d, (the time taken for messages to traverse the network link between the two nodes) and the slave offset, θ, (time offset by which the slave clock leads or lags the master). Messages containing current time information are adjusted to account for their path delay, therefore providing a more accurate representation of the time information conveyed. Under the assumption that the delays for the two paths are symmetric (the delay in one direction is the same as the delay in the opposite direction), the following relationships can be derived (see FIG. 2):

$$X = T_2 - T_1 = \theta + d \quad (1)$$

$$Y = T_4 - T_3 = -\theta + d \quad (2)$$

From these equations, the slave computes the fixed delay d and clock offset θ, as follows:

$$d = \frac{(T_2 - T_1) + (T_4 - T_3)}{2} = \frac{X + Y}{2} \quad (3)$$

$$\theta = \frac{(T_2 - T_1) - (T_4 - T_3)}{2} = \frac{X - Y}{2} \quad (4)$$

The clock offset θ can be used to align the local clock to the master's. A key assumption here is that the message exchanges occur over a period of time so small that the offset θ can be assumed constant over that period. In addition, the accuracy of this link delay measurement depends on both the symmetry of the one-way link delays and the accuracy of the timestamping process.

A complete IEEE 1588-based solution at a time client includes servo algorithms, filters, PTP-Clock based on hardware timer and direct timer access. IEEE 1588 defines a wide range of synchronization capabilities except the clock synchronization mechanisms (servo algorithm, PLL, timers, etc.) to be used at the receiver (slave) to synchronize its local clock to the master. Methods of clock adjustment implementation are not specified by IEEE 1588—it only provides a standard protocol for the exchange of messages between clocks. The benefit of not specifying clock adjustment implementations, is to allow clocks from different manufactures to be able to synchronize with each other as long as they understand the messaging protocol.

There are a number of factors that can cause two supposedly identical clocks to drift apart or lose synchronization. Differences in temperature, the age of the oscillators themselves, manufacturing defects and material variations in the manufacturing process, and electric and magnetic interference, among other factors, can all affect the quality of synchronization.

Even the smallest errors in keeping time can significantly add up over a long period. If a clock frequency (skew) is off by just 10 parts per million (ppm), it will gain or lose almost a second a day (i.e., $24 \times 60 \times 60/10^5 = 0.86$ s/day). All of these factors create a need for clock synchronization to allow for two clocks to be aligned when differences occur. The continuous variations of the above factors also explain why the process of synchronization is continuous and not a one-time process. Clearly, having any sort of meaningful time synchronization is almost impossible if clocks are allowed to run on their own without synchronization.

The above simple analysis shows that clock skew is the main reason why clocks drift apart and need to be aligned periodically. The analysis shown earlier based on FIG. 2 does not explicitly consider clock skew in the system. Adjusting for the clock skew in addition to the initial clock offset guarantees the long term reliability of the synchronization process. Critical applications like those enumerated above require higher synchronization accuracy and reliability.

An object of the present invention is to achieve accurate and robust synchronization, preferably over IEEE 1588, for critical applications that require stringent synchronization margins.

SUMMARY OF THE INVENTION

An exemplary aspect of the present invention provides a method of synchronizing a local clock in a time client to a master clock in a time server, the method including the steps of: transmitting messages carrying timestamps from the time server and from the time client; receiving the messages from the time server at the time client and extracting timestamps from said messages; receiving the messages from the time client at the time server and extracting timestamps from said messages; estimating the skew and offset of the local clock compared to the master clock; and adjusting the output of the local clock using said estimated skew and offset, wherein the step of estimating the skew and offset includes the sub-steps of: estimating the clock skew from the extracted timestamps over a predetermined observation period; calculating a plurality of delay observations for each message exchange between the time server and the time client in the observation period; determining, from said series of delay observations, one or more representative delay values for the observation window; and estimating the clock offset from the selected representative delay values.

A further exemplary aspect of the present invention provides a networked time system including a time server and at least one time client connected to the time server over a network, wherein: the time server includes a master clock and a server control unit and transmits messages carrying timestamps from the master clock; the time client includes a local clock and a client control unit and transmits messages carrying timestamps from the local clock, wherein: the server control unit is arranged to receive the messages from the time client and to extract the timestamps from said messages; and the client control unit is arranged to: receive the messages from the time server and to extract the timestamps from said messages; estimate the skew and offset of the local clock compared to the master clock; and adjust the output of the local clock using said estimated skew and offset, the client control unit being arranged to estimate the skew and offset of the local clock by: estimating the clock skew from the extracted timestamps over a predetermined observation period; calculating a plurality of delay observations for each message exchange between the time server and the time client in the observation period; determining, from said series of delay observations, one or more representative delay values for the observation window; and estimating the clock offset from the selected representative delay values.

A further exemplary embodiment of the present invention provides a time client communicably coupled to a time server having a master clock over a network, the time client comprising: a local clock; and a control unit, wherein the control unit is arranged to: receive messages carrying timestamps from the time server and to extract the timestamps from said messages; estimate the skew and offset of the local clock compared to the master clock; and adjust the output of the local clock using said estimated skew and offset, the control unit being arranged to estimate the skew and offset of the local clock by: estimating the clock skew from the extracted timestamps over a predetermined observation period; calculating a plurality of delay observations for each message exchange between the time server and the time client in the observation period; determining, from said series of delay observations, one or more representative delay values for the observation window; and estimating the clock offset from the selected representative delay values.

BRIEF DESCRIPTION OF THE DRAWINGS

Embodiments of the invention will now be described by way of example with reference to the accompanying drawings in which.

DETAILED DESCRIPTION

Figure 1:
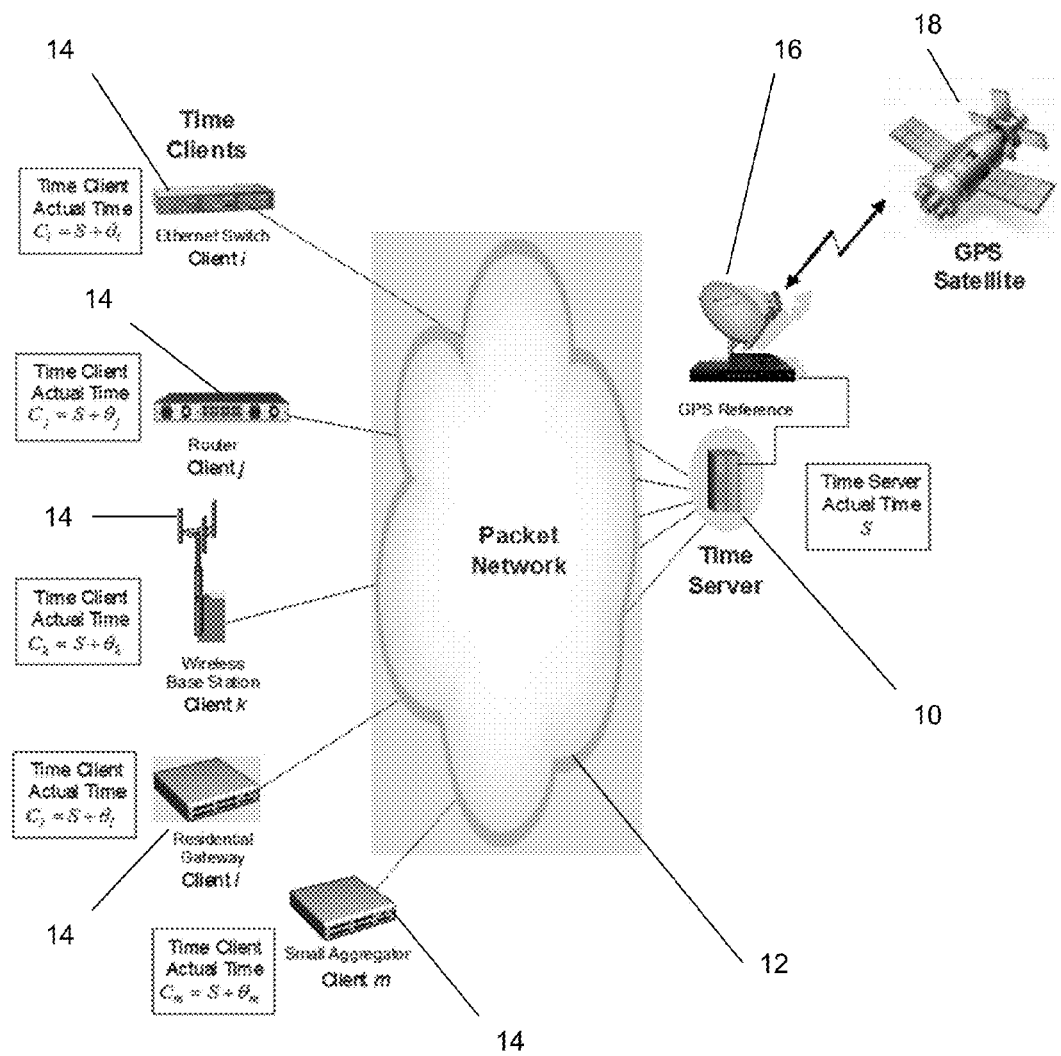
FIG. 1 shows a general view of some of the devices that require time synchronisation in a packet network and has already been described.

Accordingly, at its broadest, a first aspect of the present invention provides a method of synchronizing a local clock to a master clock by estimating the skew and offset of the local clock compared to the master clock and adjusting the output of the local clock accordingly.

A first aspect of the present invention preferably provides a method of synchronizing a local clock in a time client to a master clock in a time server, the method including the steps of: transmitting messages carrying timestamps from the time server and from the time client; receiving the messages from the time server at the time client and extracting timestamps from said messages; receiving the messages from the time client at the time server and extracting timestamps from said messages; estimating the skew and offset of the local clock compared to the master clock; and adjusting the output of the local clock using said estimated skew and offset, wherein the step of estimating the skew and offset includes the sub-steps of: estimating the clock skew from the extracted timestamps over a predetermined observation period; calculating a plurality of delay observations for each message exchange between the time server and the time client in the observation period; determining, from said series of delay observations, one or more representative delay values for the observation window; and estimating the clock offset from the selected representative delay values.

By taking into account the estimated clock skew in the adjustment of the output of the local clock, and in particular in the determination of the offset, a more accurate synchronization of the local clock to the master clock of the time server can be achieved.

Preferably the messages are IEEE 1588 PTP messages. This allows the method to work using the timing protocol messages that are already exchanged in known format between a time server and a time client.

In particular, the messages transmitted from the time server may include IEEE 1588 Sync messages, and the messages transmitted from the time client may include IEEE 1588 Delay_Req messages. This allows the time server and time client to determine the delays in arrival of the messages in each direction and, on the assumption that the transmission delays in each direction are the same, estimate the effects of skew and offset of the local clock.

In one embodiment, the estimation of the clock skew $\alpha$ is calculated as:

$$1 + \alpha = \frac{(T_{2,L} - T_{2,1}) + (T_{3,L} - T_{3,1})}{(T_{1,L} - T_{1,1}) + (T_{4,L} - T_{4,1})},$$

wherein: $T_{1,1}$ and $T_{1,L}$ are the timestamps applied by the time server to respectively the first and last Sync messages in the observation window; $T_{2,1}$ and $T_{2,L}$ are the times of receipt as recorded by the local clock on receipt of respectively the first and last Sync messages in the observation window; $T_{3,1}$ and $T_{3,L}$ are the timestamps applied by the time client to the first and last Delay_Req messages in the observation window; and $T_{4,1}$ and $T_{4,L}$ are the times of receipt as recorded by the master clock on receipt of respectively the first and last Delay_Req messages in the observation window.

In one embodiment the delay observations are, over the observation window defined by $1 \leq i \leq L$:

$$\tilde{X}_i = X_i - \alpha T_{1,i}$$
$$= T_{2,i} - (1 + \alpha)T_{1,i}$$

and $$\tilde{Y}_i = Y_i + \alpha T_{4,i}$$
$$= (1 + \alpha)T_{4,i} - T_{3,i},$$

wherein: $\alpha$ is the estimated clock skew; $T_{1,i}$ is the timestamp applied by the time server to the ith Sync message in the observation window; $T_{2,i}$ is the time of receipt as recorded by the local clock on receipt of the ith Sync message; $T_{3,i}$ is the timestamp applied by the time client to the ith Delay_Req message; and $T_{4,i}$ is the time of receipt as recorded by the master clock on receipt of the ith Delay_Req message.

Preferably the step of selecting selects the representative delay values as the minimum values of $\tilde{X}_i$ and $\tilde{Y}_i$ from within the observation window, i.e. $\tilde{X}_{set} = \min_{1 \leq i \leq L} \tilde{X}_i$ and $\tilde{Y}_{set} = \min_{1 \leq i \leq L} \tilde{Y}_i.$ In this arrangement the clock offset may be estimated as:

$$\theta = \frac{\tilde{X}_{set} - \tilde{Y}_{set}}{2}.$$

Under the IEEE 1588 PTP, message exchanges are performed regularly between server and client. The method of this aspect preferably further includes repeatedly performing the steps of transmitting, receiving, estimating and adjusting on a periodic basis, for example every time a particular group of message exchanges (such as the Sync, Follow_Up, Delay_Req and Delay_Resp message exchange) is completed, or after a predetermined number of such message exchanges.

Embodiments of this first aspect may include some, all or none of the above described optional or preferred features.

The method of the first aspect is preferably, but not necessarily, used to control a time system according to the second aspect below or a time client according to the third aspect below, including some, all or none of the optional or preferred features of those aspects.

At its broadest, a second aspect of the present invention provides a networked time system in which a time client can estimate the skew and offset of a local clock compared to a master clock in a time server and adjust the output of a local clock using that skew and offset.

Accordingly a second aspect of the present invention preferably provides a networked time system including a time server and at least one time client connected to the time server over a network, wherein: the time server includes a master clock and a server control unit and transmits messages carrying timestamps from the master clock; the time client includes a local clock and a client control unit and transmits messages carrying timestamps from the local clock, wherein: the server control unit is arranged to receive the messages from the time client and to extract the timestamps from said messages; and the client control unit is arranged to: receive the messages from the time server and to extract the timestamps from said messages; estimate the skew and offset of the local clock compared to the master clock; and adjust the output of the local clock using said estimated skew and offset, the client control unit being arranged to estimate the skew and offset of the local clock by: estimating the clock skew from the extracted timestamps over a predetermined observation period; calculating a plurality of delay observations for each message exchange between the time server and the time client in the observation period; determining, from said series of delay observations, one or more representative delay values for the observation window; and estimating the clock offset from the selected representative delay values.

By taking into account the clock skew in the adjustment of the output of the local clock, and in particular in the determination of the offset, a more accurate synchronization of the local clock to the master clock of the time server can be achieved.

By taking into account the clock skew in the adjustment of the output of the local clock, and in particular in the determination of the offset, a more accurate synchronization of the local clock to the master clock of the time server can be achieved.

Preferably the messages are IEEE 1588 PTP messages. This allows the networked time system to use the timing protocol messages that are already exchanged in known format between a time server and a time client.

In particular, the messages transmitted from the time server may include IEEE 1588 Sync messages, and the messages transmitted from the time client may include IEEE 1588 Delay_Req messages. This allows the time server and time client to determine the delays in arrival of the messages in each direction and, on the assumption that the transmission delays in each direction are the same, estimate the effects of skew and offset of the local clock.

In one embodiment the estimation of the clock skew $\alpha$ is calculated as:

$$1 + \alpha = \frac{(T_{2,L} - T_{2,1}) + (T_{3,L} - T_{3,1})}{(T_{1,L} - T_{1,1}) + (T_{4,L} - T_{4,1})},$$

wherein: $T_{1,1}$ and $T_{1,L}$ are the timestamps applied by the time server to respectively the first and last Sync messages in the observation window; $T_{2,1}$ and $T_{2,L}$ are the times of receipt as recorded by the local clock on receipt of respectively the first and last Sync messages in the observation window; $T_{3,1}$ and $T_{3,L}$ are the timestamps applied by the time client to the first and last Delay_Req messages in the observation window; and $T_{4,1}$ and $T_{4,L}$ are the times of receipt as recorded by the master clock on receipt of respectively the first and last Delay_Req messages in the observation window.

In one embodiment, the delay observations are, over the observation window defined by $1 \le i \le L$:

$$\tilde{X}_i = X_i - \alpha T_{1,i}$$
$$= T_{2,i} - (1 + \alpha) T_{1,i}$$

and $$\tilde{Y}_i = Y_i + \alpha T_{4,i},$$
$$= (1 + \alpha) T_{4,i} - T_{3,i}$$

wherein: $\alpha$ is the estimated clock skew; $T_{1,i}$ is the timestamp applied by the time server to the ith Sync message in the observation window; $T_{2,i}$ is the time of receipt as recorded by the local clock on receipt of the ith Sync message; $T_{3,i}$ is the timestamp applied by the time client to the ith Delay_Req message; and $T_{4,i}$ is the time of receipt as recorded by the master clock on receipt of the ith Delay_Req message.

The control unit may select the representative delay values as the minimum values of $\tilde{X}_i$ and $\tilde{Y}_i$ from within the observation window, i.e. $\tilde{X}_{set} = \min_{1 \le i \le L} \tilde{X}_i$ and $\tilde{Y}_{set} = \min_{1 \le i \le L} \tilde{Y}_i$.

In this arrangement the clock offset may be estimated as:

$$\theta = \frac{\tilde{X}_{set} - \tilde{Y}_{set}}{2}.$$

The client control unit preferably adjusts the output of the local clock on a periodic basis.

Under the IEEE 1588 PTP, message exchanges are performed regularly between server and client. The server control unit and the client control unit preferably repeatedly carry out the steps of transmitting, receiving, estimating and adjusting on a periodic basis, for example every time a particular group of message exchanges (such as the Sync, Follow_Up, Delay_Req and Delay_Resp message exchange) is completed, or after a predetermined number of such message exchanges.

Preferably the local clock includes a free-running oscillator which supplies pulses to a free-running counter.

Embodiments of this second aspect may include some, all or none of the above described optional or preferred features.

At its broadest, a third aspect of the present invention provides a time client having a local clock which is arranged to estimate the offset and skew of that clock compared to a master clock in a time server and to adjust the output of the local clock using the estimated offset and skew.

Accordingly a third aspect of the present invention preferably provides a time client communicably coupled to a time server having a master clock over a network, the time client comprising: a local clock; and a control unit, wherein the control unit is arranged to: receive messages carrying timestamps from the time server and to extract the timestamps from said messages; estimate the skew and offset of the local clock compared to the master clock; and adjust the output of the local clock using said estimated skew and offset, the control unit being arranged to estimate the skew and offset of the local clock by: estimating the clock skew from the extracted timestamps over a predetermined observation period; calculating a plurality of delay observations for each message exchange between the time server and the time client in the observation period; determining, from said series of delay observations, one or more representative delay values for the observation window; and estimating the clock offset from the selected representative delay values.

Preferably the messages are IEEE 1588 PTP messages. This allows the time client to use the timing protocol messages that are already exchanged in known format between a time server and a time client.

In particular, the messages transmitted from the time server may include IEEE 1588 Sync messages, and the messages transmitted from the time client may include IEEE 1588

Delay_Req messages. This allows the time server and time client to determine the delays in arrival of the messages in each direction and, on the assumption that the transmission delays in each direction are the same, estimate the effects of skew and offset of the local clock.

In one embodiment, the estimation of the clock skew $\alpha$ is calculated as:

$$1 + \alpha = \frac{(T_{2,L} - T_{2,1}) + (T_{3,L} - T_{3,1})}{(T_{1,L} - T_{1,1}) + (T_{4,L} - T_{4,1})},$$

wherein: $T_{1,1}$ and $T_{1,L}$ are the timestamps applied by the time server to respectively the first and last Sync messages in the observation window; $T_{2,1}$ and $T_{2,L}$ are the times of receipt as recorded by the local clock on receipt of respectively the first and last Sync messages in the observation window; $T_{3,1}$ and $T_{3,L}$ are the timestamps applied by the time client to the first and last Delay_Req messages in the observation window; and $T_{4,1}$ and $T_{4,L}$ are the times of receipt as recorded by the master clock on receipt of respectively the first and last Delay_Req messages in the observation window.

In one embodiment the delay observations are, over the observation window defined by $1 \leq i \leq L$:

$$\tilde{X}_i = X_i - \alpha T_{1,i}$$
$$= T_{2,i} - (1 + \alpha) T_{1,i}$$

and $$\tilde{Y}_i = Y_i + \alpha T_{4,i},$$
$$= (1 + \alpha) T_{4,i} - T_{3,i}$$

wherein: $\alpha$ is the estimated clock skew; $T_{1,i}$ is the timestamp applied by the time server to the ith Sync message in the observation window; $T_{2,i}$ is the time of receipt as recorded by the local clock on receipt of the ith Sync message; $T_{3,i}$ is the timestamp applied by the time client to the ith Delay_Req message; and $T_{4,i}$ is the time of receipt as recorded by the master clock on receipt of the ith Delay_Req message.

The control unit may select the representative delay values as the minimum values of $\tilde{X}_i$ and $\tilde{Y}_i$ from within the observation window, i.e. $\tilde{X}_{set} = \min_{1 \leq i \leq L} \tilde{X}_i$ and $\tilde{Y}_{set} = \min_{1 \leq i \leq L} \tilde{Y}_i$.

In this arrangement the clock offset may be estimated as:

$$\theta = \frac{\tilde{X}_{set} - \tilde{Y}_{set}}{2}.$$

The control unit preferably adjusts the output of the local clock on a periodic basis.

Under the IEEE 1588 PTP, message exchanges are performed regularly between server and client. The control unit preferably repeatedly carries out the steps of transmitting, receiving, estimating and adjusting on a periodic basis, for example every time a particular group of message exchanges (such as the Sync, Follow_Up, Delay_Req and Delay_Resp message exchange) is completed, or after a predetermined number of such message exchanges.

Preferably the local clock includes a free-running oscillator which supplies pulses to a free-running counter.

Embodiments of this third aspect may include some, all or none of the above described optional or preferred features.

Figure 3A:
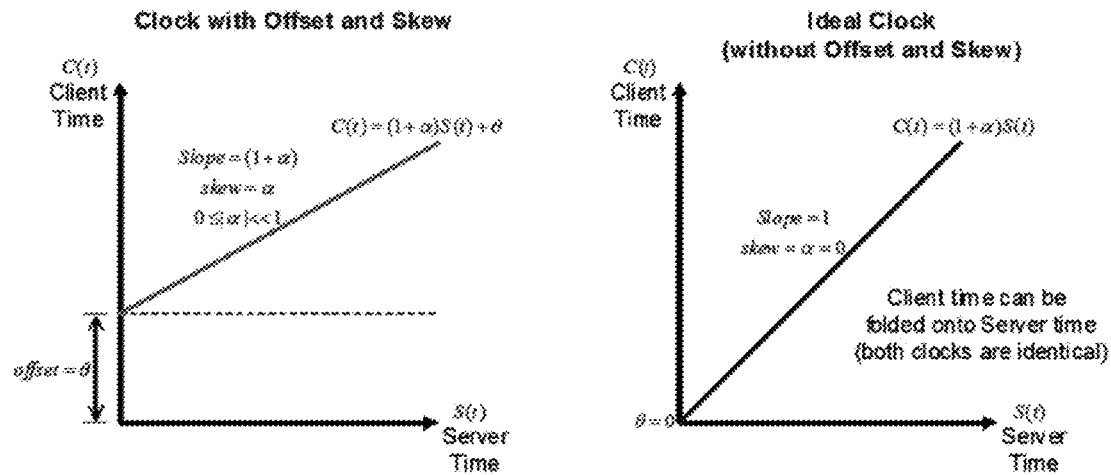
FIGS. 3a and 3b illustrate two variants of the common linear clock models used in clock synchronization analysis.
Figure 3B:
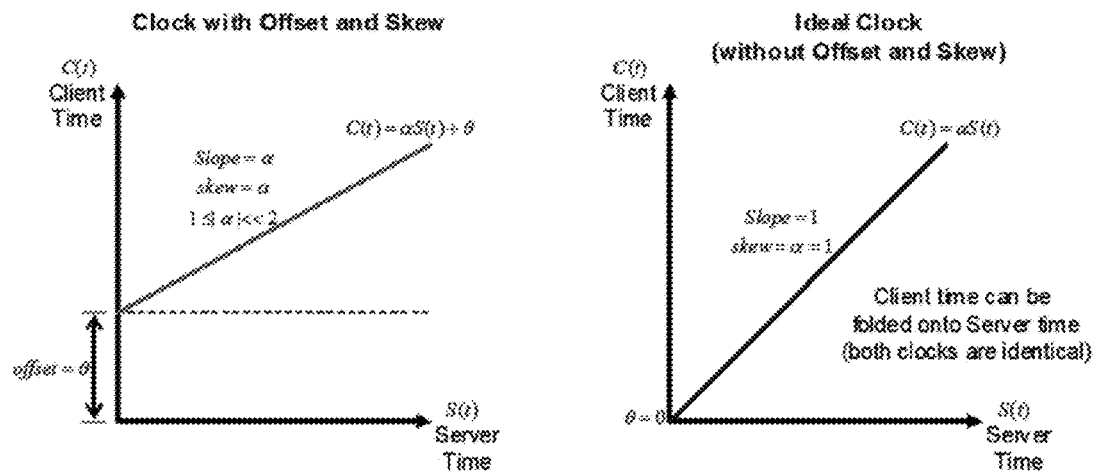

FIGS. 3a and 3b illustrate two variants of the common linear clock models used in clock synchronization analysis. In FIG. 3a, $\alpha$ is a very small number expressed in parts per million (ppm) or parts per billion (ppb). In FIG. 3b, the fractional part of a (i.e. $\alpha$–1) is also a very small number expressed in ppm or ppb.

Figure 2:
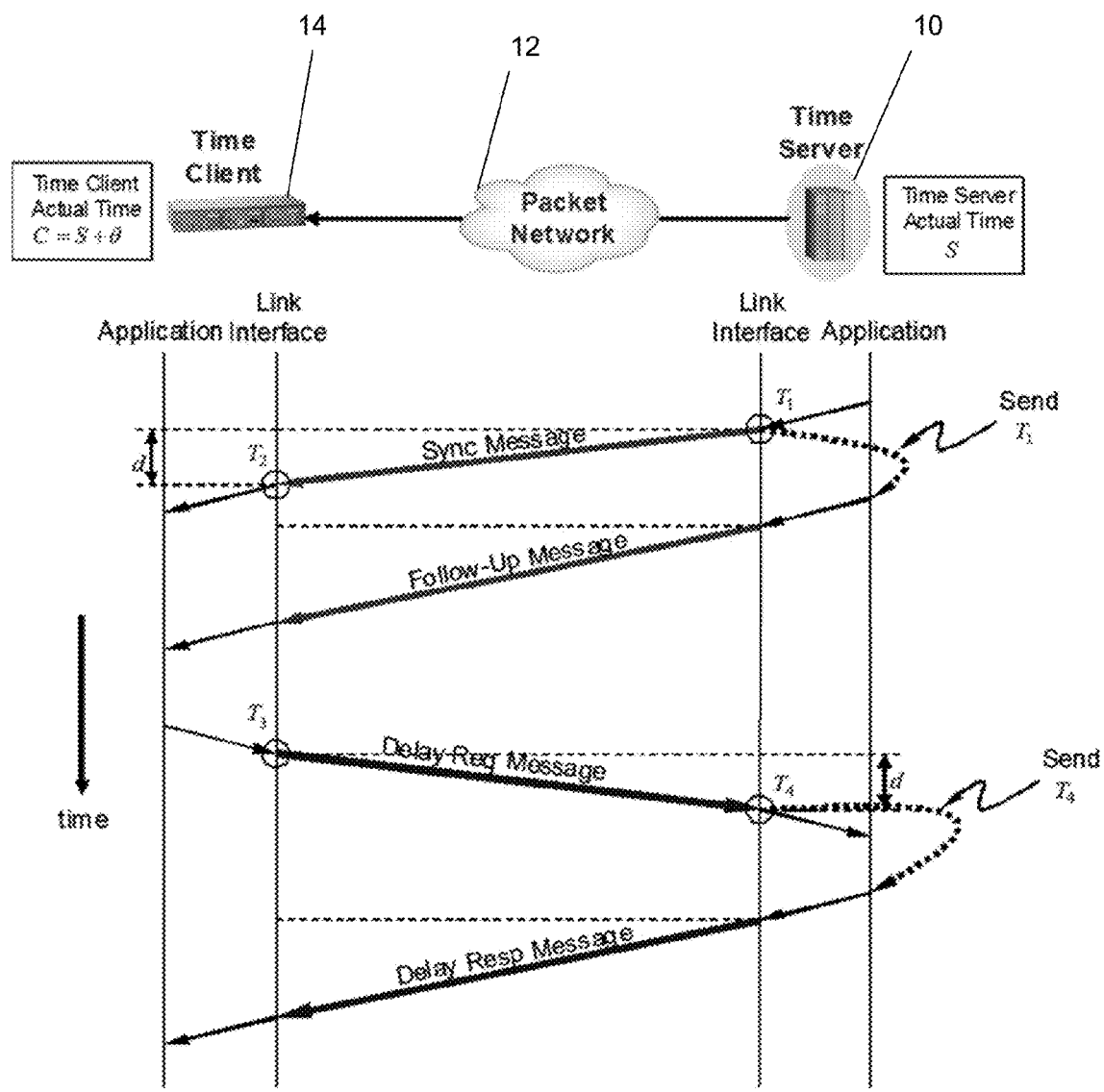
FIG. 2 shows a general overview of synchronization with IEEE 1588 PTP using a series of message transactions between a master and its slave(s) and has already been described.
Figure 4:
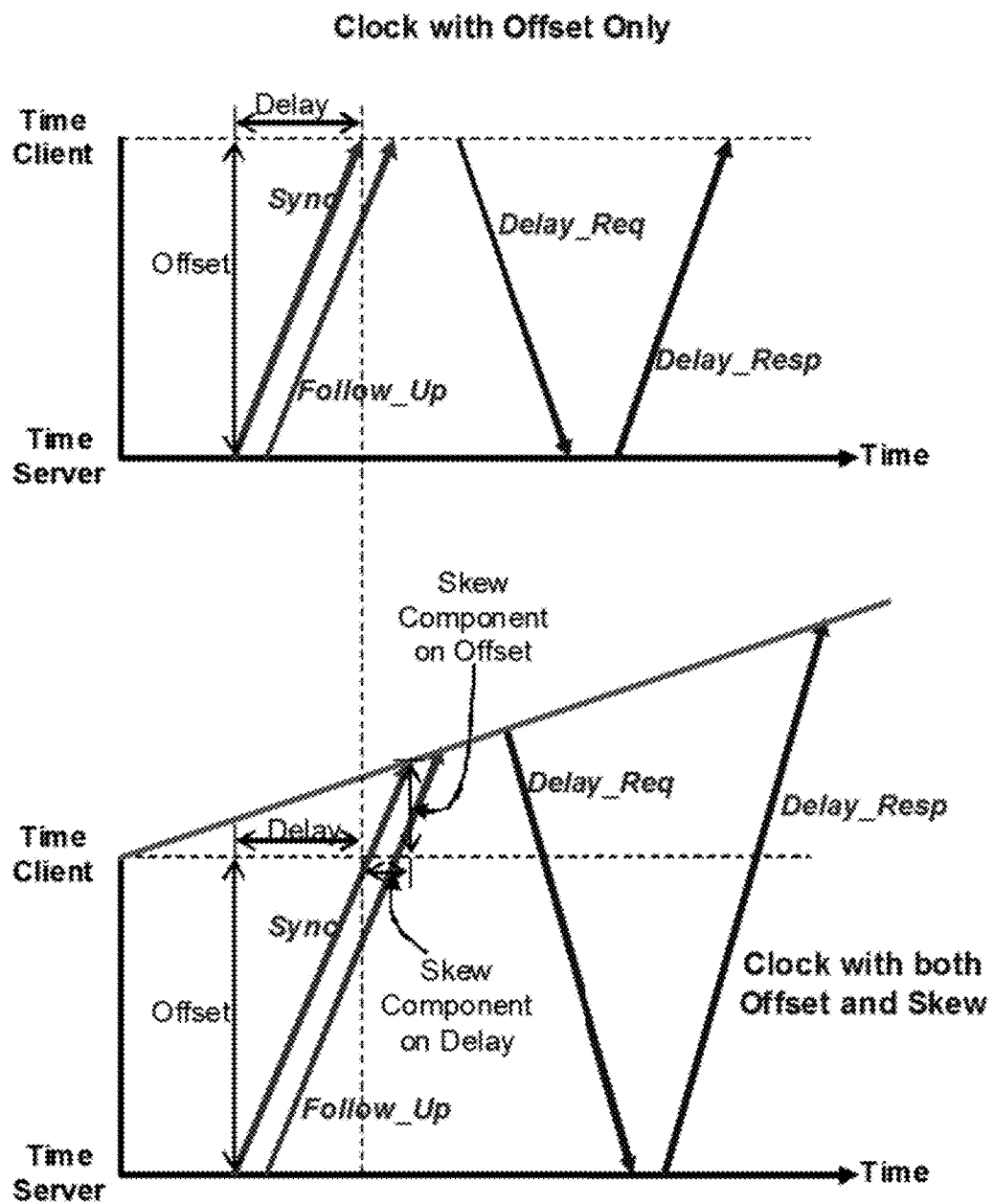
FIG. 4 shows the extension of the basic IEEE 1588 PTP protocol message exchange timing diagram to cover the case where clock offset and skew exists between the client and the server.

FIG. 4 extends the basic IEEE 1588 PTP protocol message exchange timing diagram (e.g. as illustrated in FIG. 2 and described above) to cover the case where clock offset and skew exists between the client and the server. FIG. 4 highlights the various contributions the clock skew makes on the clock offset and system delay as shown in the lower diagram compared to the upper diagram in which the clock demonstrates offset only. The two figures in FIG. 4 become identical when there is zero skew between the clocks.

Figure 5:
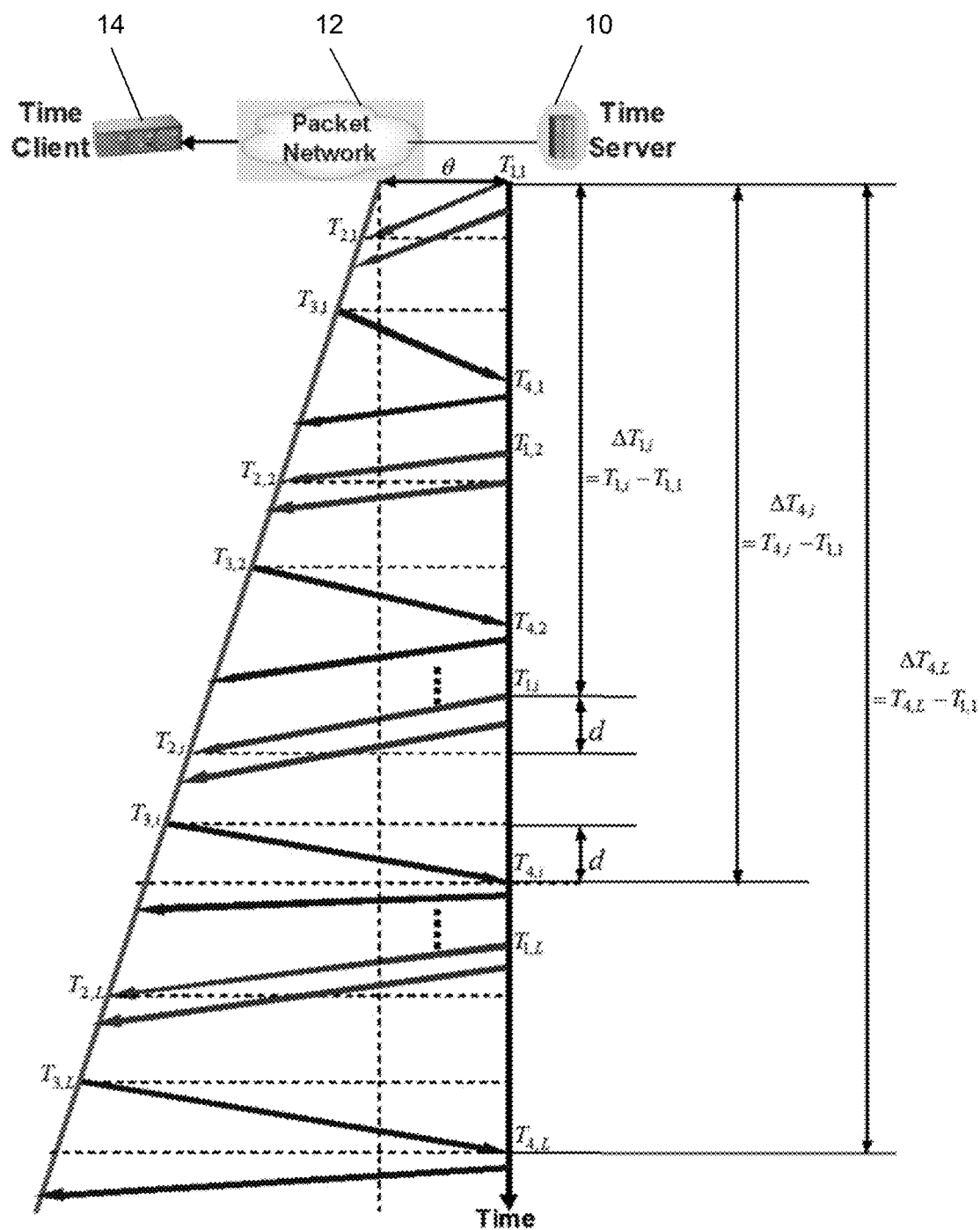
FIG. 5 shows a clock model derived from a combination of FIGS. 3 and 4.

Using the clock models in FIG. 3 and FIG. 4, the model in FIG. 5 can be obtained. Since no two clock oscillators will run at exactly the same frequency, there will always be a clock skew and the two clocks will have an increasing or decreasing clock offset.

Figure 6:
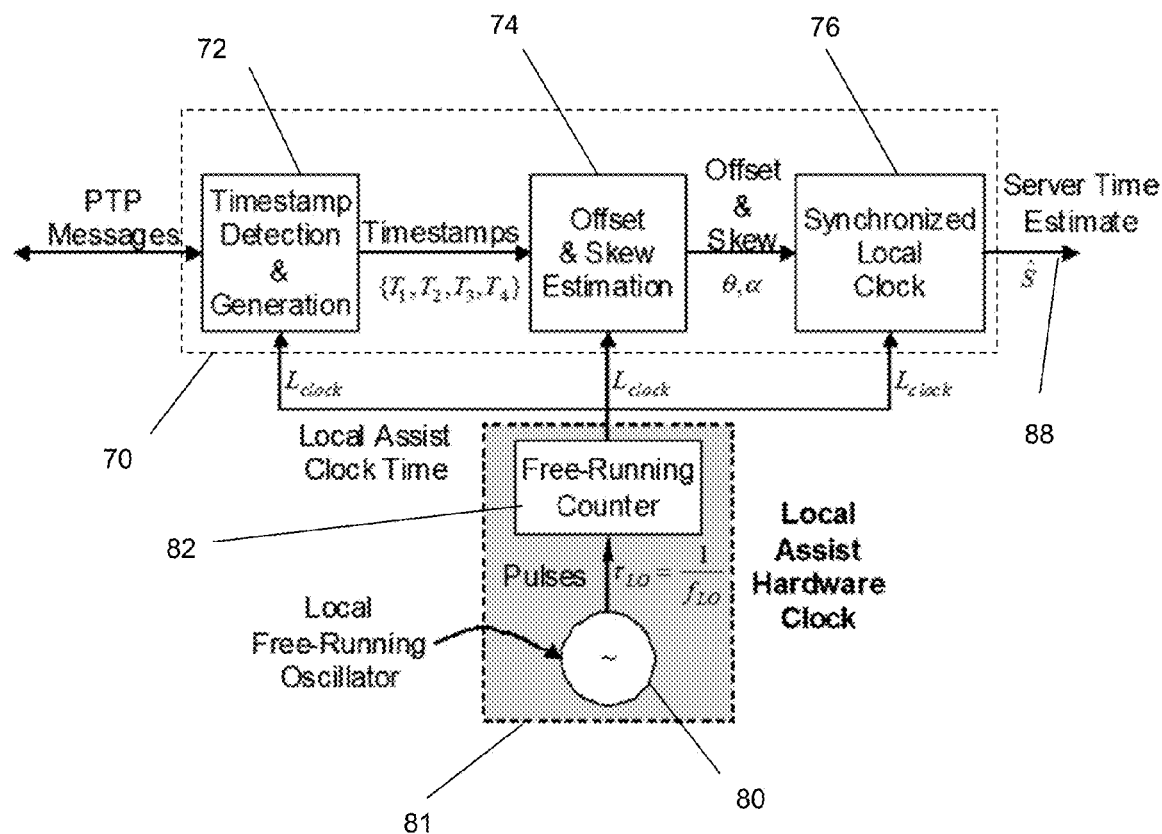
FIG. 6 shows the architecture of a time client according to an embodiment of the present invention with a local clock and an estimation algorithm according to a further embodiment of the present invention.

The techniques proposed in the following embodiments of the present invention assume that a free-running local clock is used at the client 14. In this case, the frequency of the client's local oscillator is not adjusted, but it is allowed to free-run. The free running clock is used for timestamping and for synthesizing an image of the server clock (synchronized local clock) for the time client (FIG. 6). The timestamps indicated in FIG. 5 at the client are with respect to this local clock. Timestamps at the client are captured according to the client's free running local oscillator as depicted in FIG. 6.

From the clock models given in FIGS. 3 to 5, the following relationships can be obtained from the ith Sync and Follow_Up messages:

$$T_{2,i} = (T_{1,i} + d) + \text{offset} + \alpha(\text{elapse time}) \quad (5)$$
$$= (T_{1,i} + d) + \theta_R + \alpha \cdot \Delta T_{1,i}$$
$$= (T_{1,i} + d) + \theta_R + \alpha(T_{1,i} - T_{1,1} + d)$$
$$= (T_{1,i} + d) + \theta + \alpha(T_{1,i} + d)$$
$$= (1 + \alpha)(T_{1,i} + d) + \theta$$

The term $\theta = (\theta_R - \alpha T_{1,1})$ denotes the initial reference offset that has to be estimated so that the client can align its clock to that of the server. From the ith Delay_Req and Delay_Resp messages, we get the following relationships:

$$T_{3,i} = (T_{4,i} - d) + \text{offset} + \alpha(\text{elapse time}) \quad (6)$$
$$= (T_{4,i} - d) + \theta_R + \alpha \cdot \Delta T_{4,i}$$
$$= (T_{4,i} - d) + \theta_R + \alpha(T_{4,i} - T_{1,1} - d)$$
$$= (T_{4,i} - d) + \theta + \alpha(T_{4,i} - d)$$
$$= (1 + \alpha)(T_{4,i} - d) + \theta$$

Note that setting $\alpha=0$ in (5) and (6) (that is, for a system with no skew and offset only), we get the set of equations obtained earlier on from FIG. 2.

Now let us assume that timestamp measurements are collected over a window of L complete protocol message exchanges (FIG. 5). We also assume in our skew based clock model (FIGS. 3 to 5) that the clock difference between the client and the server is monotonically increasing (or decreasing) within the observation window. If we assume that the maximum clock difference occurs between the first and Lth protocol exchange, then we can develop the following relationships from the linear skew model in FIG. 4 and the above set of equations. From (5), we obtain $T_{2,1}$ and $T_{2,L}$ as:

$$T_{2,1} = (T_{1,1} + d) + \theta_R + \alpha(T_{1,1} - T_{1,1} + d) \quad (7)$$
$$= (T_{1,1} + d) + \theta_R + \alpha d$$

$$T_{2,L} = (T_{1,L} + d) + \theta_R + \alpha(T_{1,L} - T_{1,1} + d) \quad (8)$$

Subtracting (7) from (8) we obtain $$T_{2,L} - T_{2,1} = T_{1,L} - T_{1,1} + \alpha[T_{1,L} - T_{1,1}] \quad (9)$$

From (6), we obtain $T_{4,1}$ and $T_{4,L}$ as $$T_{3,1} = (T_{4,1} - d) + \theta_R + \alpha(T_{4,1} - T_{1,1} - d) \quad (10)$$

$$T_{3,L} = (T_{4,L} - d) + \theta_R + \alpha(T_{4,L} - t_{1,1} - d) \quad (11)$$

Subtracting (10) from (11) we obtain $$T_{3,L} - T_{3,1} = T_{4,L} - T_{4,1} + \alpha(T_{4,L} - T_{4,1}) \quad (12)$$

now adding (9) and (12) and solving for $\alpha$ we get $$\alpha = \frac{(T_{2,L} - T_{2,1}) + (T_{3,L} - T_{3,1}) -}{(T_{1,L} - T_{1,1}) + (T_{4,L} - T_{4,1})} \quad (13)$$

$$1 + \alpha = \frac{(T_{2,L} - T_{2,1}) + (T_{3,L} - T_{3,1})}{(T_{1,L} - T_{1,1}) + (T_{4,L} - T_{4,1})} \quad (14)$$

From (5) and (6), let us define the following delay terms:

$$X_i = T_{2,i} - T_{1,i} \quad (15)$$
$$= d + \theta + \alpha(T_{1,i} + d)$$
$$= \alpha T_{1,i} + (1+\alpha)d + \theta$$
$$= \alpha T_{1,i} + \tilde{X}_i$$

or $$\tilde{X}_i = X_i - \alpha T_{1,i} \quad (16)$$
$$= T_{2,i} - (1+\alpha)T_{1,i}$$

and $$Y_i = T_{4,i} - T_{3,i} \quad (17)$$
$$= d - \theta - \alpha(T_{4,i} - d)$$
$$= -\alpha T_{4,i} + (1+\alpha)d - \theta$$
$$= -\alpha T_{4,i} + \tilde{Y}_i$$

or $$\tilde{Y}_i = Y_i + \alpha T_{4,i} \quad (18)$$
$$= (1+\alpha)T_{4,i} - T_{3,i}$$

Note that $\tilde{X}_i = X_i$ and $\tilde{Y}_i = Y_i$ when $\alpha=0$ as expected. It can be seen from (15) and (17) that $$\tilde{X}_i - \tilde{Y}_i = (1+\alpha)d + \theta - (1+\alpha)d + \theta \quad (19)$$
$$= 2\theta$$

or $$\theta = \frac{\tilde{X}_i - \tilde{Y}_i}{2} \quad (20)$$

The clock synchronization algorithm with offset and skew compensation according to an embodiment of the present invention can now be summarized as follows:

1. After L protocol message exchanges (observation window), estimate clock skew $\alpha$ from (13) or (14).
2. Compute set of delay observations and $\tilde{X}_i$ and $\tilde{Y}_i$, i=1, 2, ..., L, from (16) and (18), respectively.
3. Determine a representative delay value for the observation window L by applying a selection or averaging criterion to the set of delay observations (for example, $$\tilde{X}_{set} = \min_{1 \leq i \leq L} \tilde{X}_i$$

and $$\tilde{Y}_{set} = \min_{1 \leq i \leq L} \tilde{Y}_i).$$

4. Compute the clock offset using $$\theta = \frac{\tilde{X}_{set} - \tilde{Y}_{set}}{2}.$$

FIG. 6 shows a time client according to an embodiment of the present invention and which, when connected to a time server having a master clock over a network (particularly a packet network) forms a networked time system according to a further embodiment of the present invention. The time client is shown in schematic form with the main functional blocks of the synchronization technique according to a further embodiment of the present invention.

Local clock 81 is made up from a local free-running oscillator 80 which feeds pulses at a rate inversely proportional to the frequency of the oscillator to a free-running counter 82 which produces the local clock time.

The control unit 70 carries out a series of functions in conjunction with PTP messages to/from a time server (not shown) over a network (not shown). Firstly, timestamps from the local clock 81 are applied to outgoing PTP messages and timestamps from the master clock in the time server are extracted from incoming PTP messages by the timestamp detection & generation function 72.

These timestamps are fed to the offset and skew estimator 74 which repeatedly and periodically estimates the offset $\theta$ and skew $\alpha$ of the local clock. These values are then passed to the synchronizer 76 which applies them to the output of the local clock 81 in order to produce a clock output 88 which is estimated to be synchronized to the master clock in the time server. The operation of the synchronizer 76 is shown in more detail in FIG. 7.

Figure 7:
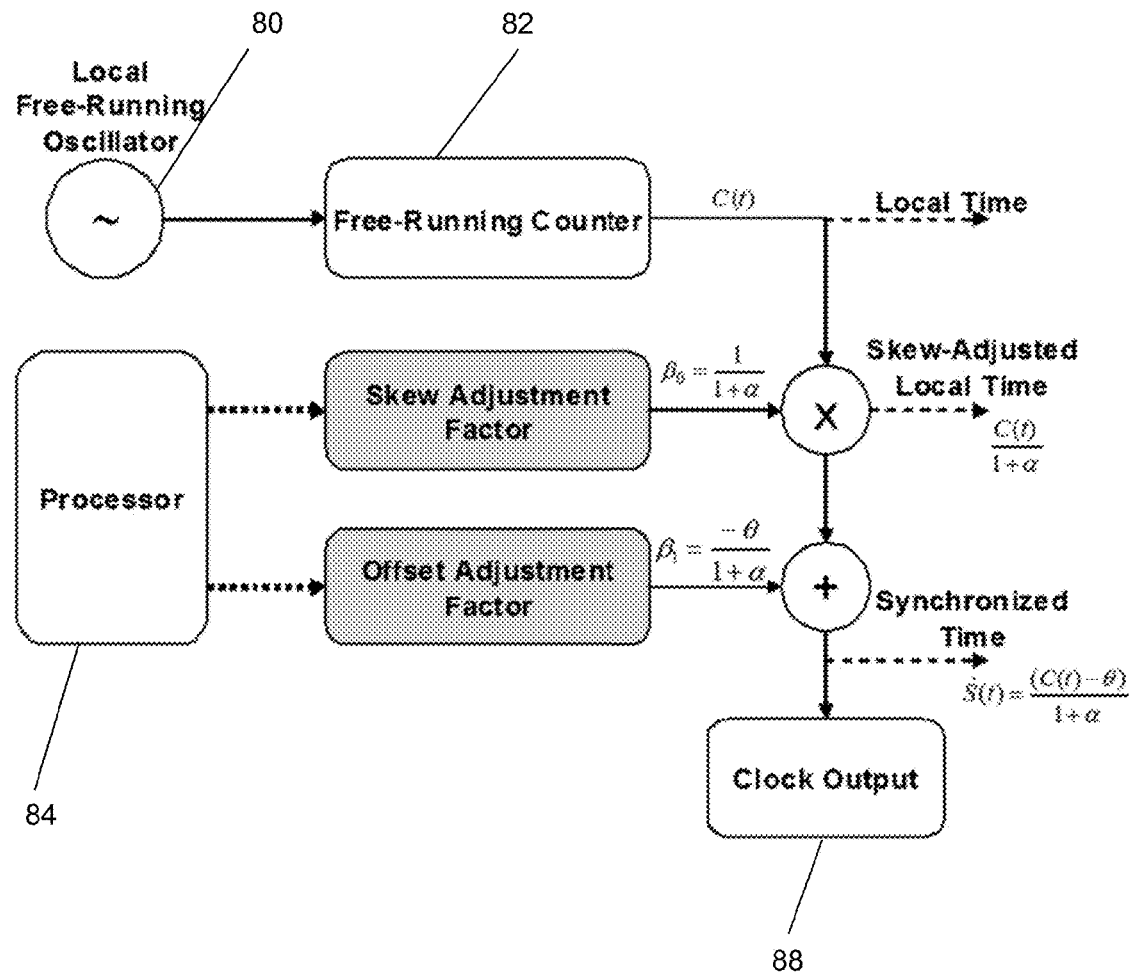
FIG. 7 shows the adjustments made to a free-running local clock to produce a synchronised clock output.

The free running local oscillator is used together with the estimated clock parameters to synthesize a synchronized local clock which is an estimated image of the server clock. Using the clock model 1 in FIG. 3a, that is, $$C(t) = (1+\alpha)S(t) + \theta,$$

the estimated clock skew and offset can then be used by the client to align its clock to the server's as illustrated in FIG. 7.

FIG. 7 shows how the local time C(t) produced by the local free running oscillator 80 and the free-running counter 82 is adjusted by the skew adjustment factor $$\beta_0 = \frac{1}{(1+\alpha)}$$

and the offset adjustment factor $$\beta_1 = \frac{-\theta}{(1+\alpha)}$$

produced by the processor 84 to produce a clock output 88 which is a synchronized time with the master clock (not shown).

Implementation

The systems and methods of the above embodiments may be implemented at least partly in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. The data storage may comprise RAM, disk drives or other computer readable media. The computer system may include a plurality of computing devices connected by a network and able to communicate with each other over that network.

The methods of the above embodiments may be provided as one or more computer programs or as computer program products or computer readable media carrying a computer program which is arranged, when run on a computer, to perform the method(s) described above.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1]. IEEE Standard for a Precision Clock Synchronization Protocol for Networked Measurement and Control Systems, *IEEE* 1588-2008.

[2]. IEEE Standard for a Precision Clock Synchronization Protocol for Networked Measurement and Control Systems, *IEEE* 1588-2002.

[3]. Mills, D., "Network Time Protocol (Version 3) Specification, Implementation and Analysis", *IETF RFC* 1305, March 1992.

[4]. R. Holler, T. Saulter, N. Kero, "Embedded SynUTC and IEEE 1588 clock synchronization for industrial Ethernet," in *Proc. IEEE Emerging Technologies and Factory Automation*, vol. 1, pp. 422-426, November 2003.

[5]. O. Gurewitz, I. Cidon and M. Sidi, "Network time synchronization using clock offset optimization," in *Proc. IEEE Int'l Conf on Network Protocols*, pp. 212-221, November 2003.

[6]. R. Subrahmanyan, "Timing recovery for IEEE 1588 applications in telecommunications," *IEEE Transactions on Inst. And Meas.*, vol. 58, no. 6, pp. 1858-1868, June 2009.

[7]. I. Hadzic, D. R. Morgan and Z. Sayeed, "A synchronization algorithm for packet MANs," *IEEE Transactions on Communications*, vol. 59, no. 4, pp. 1142-1153, April 2011.

[8]. V. Paxon, *Measurements and Analysis of End-to-End Internet Dynamics*, Ph.D. Thesis, University of California, Berkeley, 1997.

[9]. R. Ravikanth, Nokia Telecommunications Inc. (2001), Method for estimating relative skew between clocks in packet network, U.S. Pat. No. 6,327,274.

[10]. S. B. Moon, P. Skelly and D. Towsley, "Estimation and removal of clock skew from network delay measurements," in *Proc. IEEE INFOCOM*, vol. 1, pp. 227-234, New York, N.Y., USA, March 1999.

[11]. P. Skelly, S. B. Moon, D. Towsley, Verizon Laboratories Inc. (2003), Clock skew estimation and removal, U.S. Pat. No. 6,661,810.

[12]. L. Zhang, Z. Liu and C. H. Xia, "Clock synchronization algorithms for network measurements," in *Proc. IEEE INFOCOM*, vol. 1, pp. 160-169, November 2002.

[13]. Z. Liu, C. H. Xia, L. Zhang, International Business Machines Corporation (2005), Clock synchronization with removal of clock skews through network measurements in derivation of a convex hull, U.S. Pat. No. 6,957,357.

[14]. S. M. Carlson, M. H. T. Hack and L. Zhang, International Business Machines Corporation (2010), Method and system for clock skew and offset estimation, U.S. Pat. No. 7,688,865.

[15]. J. Benesty, Lucent Technologies Inc. (2006), Method for estimating clock skew within a communications network, U.S. Pat. No. 7,051,246.

All references referred to are hereby incorporated by reference.

The invention claimed is:

1. A method of synchronizing a local clock in a time client to a master clock in a time server, the method including the steps of:

transmitting messages carrying timestamps from the time server and from the time client;

receiving the messages from the time server at the time client and extracting timestamps from said messages;

receiving the messages from the time client at the time server and extracting timestamps from said messages;

estimating the skew and offset of the local clock compared to the master clock; and adjusting the output of the local clock using said estimated skew and offset, wherein the step of estimating the skew and offset includes the sub-steps of:

estimating the clock skew from the extracted timestamps over a predetermined observation period;

calculating a plurality of delay observations for each message exchange between the time server and the time client in the observation period;

determining, from said series of delay observations, one or more representative delay values for the observation window; and estimating the clock offset from the selected representative delay values; and wherein the messages are IEEE 1588 PTP messages;

wherein the messages transmitted from the time server include IEEE 1588 Sync messages, and the messages transmitted from the time client include IEEE 1588 Delay_Req messages; and wherein the estimation of the clock skew α is calculated as:

$$1 + \alpha = \frac{(T_{2,L} - T_{2,1}) + (T_{3,L} - T_{3,1})}{(T_{1,L} - T_{1,1}) + (T_{4,L} - T_{4,1})},$$

wherein:

$T_{1,1}$ and $T_{1,L}$ are the timestamps applied by the time server to respectively the first and last Sync messages in the observation window;

$T_{2,1}$ and $T_{2,L}$ are the times of receipt as recorded by the local clock on receipt of respectively the first and last Sync messages in the observation window;

$T_{3,1}$ and $T_{3,L}$ are the timestamps applied by the time client to the first and last Delay_Req messages in the observation window; and $T_{4,1}$ and $T_{4,L}$ are the times of receipt as recorded by the master clock on receipt of respectively the first and last Delay_Req messages in the observation window.

2. The method according to claim 1 wherein the delay observations are, over the observation window defined by $1 \leq i \leq L$:

$$\tilde{X}_i = X_i - \alpha T_{1,i}$$
$$= T_{2,i} - (1 + \alpha)T_{1,i}$$

and $$\tilde{Y}_i = Y_i + \alpha T_{4,i},$$
$$= (1 + \alpha)T_{4,i} - T_{3,i}$$

wherein:

α is the estimated clock skew;

$T_{1,i}$ is the timestamp applied by the time server to the ith Sync message in the observation window;

$T_{2,i}$ is the time of receipt as recorded by the local clock on receipt of the ith Sync message;

$T_{3,i}$ is the timestamp applied by the time client to the ith Delay_Req message; and $T_{4,i}$ is the time of receipt as recorded by the master clock on receipt of the ith Delay_Req message.

3. The method according to claim 2 wherein the step of selecting selects the representative delay values as the minimum values of $\tilde{X}_i$ and $\tilde{Y}_i$ from within the observation window; and wherein the clock offset is estimated as:

$$\theta = \frac{\tilde{X}_{set} - \tilde{Y}_{set}}{2}$$

wherein:

$$\tilde{X}_{set} = \min_{1 \leq i \leq L} \tilde{X}_i$$

and $$\tilde{Y}_{set} = \min_{1 \leq i \leq L} \tilde{Y}_i.$$

4. The method according to claim 1 further including repeatedly performing the steps of transmitting, receiving, estimating and adjusting on a periodic basis.

5. A networked time system including a time server and at least one time client connected to the time server over a network, wherein:

the time server includes a master clock and a server control unit and transmits messages carrying timestamps from the master clock;

the time client includes a local clock and a client control unit and transmits messages carrying timestamps from the local clock, wherein:

the server control unit is arranged to receive the messages from the time client and to extract the timestamps from said messages; and the client control unit is arranged to:

receive the messages from the time server and to extract the timestamps from said messages;

estimate the skew and offset of the local clock compared to the master clock; and adjust the output of the local clock using said estimated skew and offset, the client control unit being arranged to estimate the skew and offset of the local clock by:

estimating the clock skew from the extracted timestamps over a predetermined observation period;

calculating a plurality of delay observations for each message exchange between the time server and the time client in the observation period;

determining, from said series of delay observations, one or more representative delay values for the observation window; and estimating the clock offset from the selected representative delay values; and wherein the messages are IEEE 1588 PTP messages;

wherein the messages transmitted from the time server include IEEE 1588 Sync messages, and the messages transmitted from the time client include IEEE 1588 Delay_Req messages; and wherein the estimation of the clock skew α is calculated as:

$$1 + \alpha = \frac{(T_{2,L} - T_{2,1}) + (T_{3,L} - T_{3,1})}{(T_{1,L} - T_{1,1}) + (T_{4,L} - T_{4,1})},$$

wherein:

$T_{1,1}$ and $T_{1,L}$ are the timestamps applied by the time server to respectively the first and last Sync messages in the observation window;

$T_{2,1}$ and $T_{2,L}$ are the times of receipt as recorded by the local clock on receipt of respectively the first and last Sync messages in the observation window;

$T_{3,1}$ and $T_{3,L}$ are the timestamps applied by the time client to the first and last Delay_Req messages in the observation window; and $T_{4,1}$ and $T_{4,L}$ are the times of receipt as recorded by the master clock on receipt of respectively the first and last Delay_Req messages in the observation window.

6. The networked time system according to claim 5 wherein the delay observations are, over the observation window defined by $1 \le i \le L$:

$$\tilde{X}_i = X_i - \alpha T_{1,i}$$
$$= T_{2,i} - (1+\alpha)T_{1,i}$$

and $$\tilde{Y}_i = Y_i + \alpha T_{4,i},$$
$$= (1+\alpha)T_{4,i} - T_{3,i}$$

wherein:

$\alpha$ is the estimated clock skew;

$T_{1,i}$ is the timestamp applied by the time server to the ith Sync message in the observation window;

$T_{2,i}$ is the time of receipt as recorded by the local clock on receipt of the ith Sync message;

$T_{3,i}$ is the timestamp applied by the time client to the ith Delay_Req message; and $T_{4,i}$ is the time of receipt as recorded by the master clock on receipt of the ith Delay_Req message.

7. The networked time system according to claim 6 wherein the client control unit selects the representative delay values as the minimum values of $\tilde{X}_i$ and $\tilde{Y}_i$ from within the observation window; and wherein the clock offset is estimated as:

$$\theta = \frac{\tilde{X}_{set} - \tilde{Y}_{set}}{2}$$

wherein:

$$\tilde{X}_{set} = \min_{1 \le i \le L} \tilde{X}_i$$

and $$\tilde{Y}_{set} = \min_{1 \le i \le L} \tilde{Y}_i.$$

8. The networked time system according to claim 5 wherein the local control unit is arranged to adjust the output of the local clock on a periodic basis.

9. The networked time system according to claim 5 wherein the local clock includes a free-running oscillator which supplies pulses to a free-running counter.

10. A time client communicably coupled to a time server having a master clock over a network, the time client comprising:

a local clock; and
a control unit,
wherein the control unit is arranged to:
receive messages carrying timestamps from the time server and to extract the timestamps from said messages;
estimate the skew and offset of the local clock compared to the master clock; and
adjust the output of the local clock using said estimated skew and offset, the control unit being arranged to estimate the skew and offset of the local clock by:
estimating the clock skew from the extracted timestamps over a predetermined observation period;
calculating a plurality of delay observations for each message exchange between the time server and the time client in the observation period;
determining, from said series of delay observations, one or more representative delay values for the observation window; and
estimating the clock offset from the selected representative delay values; and
wherein the messages are IEEE 1588 PTP messages;
wherein the messages transmitted from the time server include IEEE 1588 Sync messages, and the control unit is arranged to transmit IEEE 1588 Delay_Req messages to the time server; and
wherein the estimation of the clock skew $\alpha$ is calculated as:

$$1 + \alpha = \frac{(T_{2,L} - T_{2,1}) + (T_{3,L} - T_{3,1})}{(T_{1,L} - T_{1,1}) + (T_{4,L} - T_{4,1})},$$

wherein:

$T_{1,1}$ and $T_{1,L}$ are the timestamps applied by the time server to respectively the first and last Sync messages in the observation window;

$T_{2,1}$ and $T_{2,L}$ are the times of receipt as recorded by the local clock on receipt of respectively the first and last Sync messages in the observation window;

$T_{3,1}$ and $T_{3,L}$ are the timestamps applied by the time client to the first and last Delay_Req messages in the observation window; and $T_{4,1}$ and $T_{4,L}$ are the times of receipt as recorded by the master clock on receipt of respectively the first and last Delay_Req messages in the observation window.

11. The time client according to claim 10 wherein the delay observations are, over the observation window defined by $1 \le i \le L$:

$$\tilde{X}_i = X_i - \alpha T_{1,i}$$
$$= T_{2,i} - (1+\alpha)T_{1,i}$$

and $$\tilde{Y}_i = Y_i + \alpha T_{4,i},$$
$$= (1+\alpha)T_{4,i} - T_{3,i}$$

wherein:

$\alpha$ is the estimated clock skew;

$T_{1,i}$ is the timestamp applied by the time server to the ith Sync message in the observation window;

$T_{2,i}$ is the time of receipt as recorded by the local clock on receipt of the ith Sync message;

$T_{3,i}$ is the timestamp applied by the time client to the ith Delay_Req message; and $T_{4,i}$ is the time of receipt as recorded by the master clock on receipt of the ith Delay_Req message.

12. The time client according to claim 11 wherein the control unit selects the representative delay values as the minimum values of $\tilde{X}_i$ and $\tilde{Y}_i$ from within the observation window; and wherein the clock offset is estimated as:

$$\theta = \frac{\tilde{X}_{set} - \tilde{Y}_{set}}{2}$$

wherein:

$$\tilde{X}_{set} = \min_{1 \le i \le L} \tilde{X}_i$$

and $$\tilde{Y}_{set} = \min_{1 \le i \le L} \tilde{Y}_i.$$

13. The time client according to claim 10 wherein the local control unit is arranged to adjust the output of the local clock on a periodic basis.

14. The time client according to claim 10 wherein the local clock includes a free-running oscillator which supplies pulses to a free-running counter.

15. A method of synchronizing a local clock in a time client to a master clock in a time server, the method including the steps of:
transmitting messages carrying timestamps from the time server and from the time client;
receiving the messages from the time server at the time client and extracting timestamps from said messages;
receiving the messages from the time client at the time server and extracting timestamps from said messages;
estimating the skew and offset of the local clock compared to the master clock; and
adjusting the output of the local clock using said estimated skew and offset,
wherein the step of estimating the skew and offset includes the sub-steps of:
estimating the clock skew from the extracted timestamps over a predetermined observation period;
calculating a plurality of delay observations for each message exchange between the time server and the time client in the observation period;
determining, from said series of delay observations, one or more representative delay values for the observation window; and
estimating the clock offset from the selected representative delay values; and
wherein the messages are IEEE 1588 PTP messages;
wherein the messages transmitted from the time server include IEEE 1588 Sync messages, and the messages transmitted from the time client include IEEE 1588 Delay_Req messages; and
wherein the delay observations are, over the observation window defined by $1 \le i \le L$:

$$\tilde{X}_i = X_i - \alpha T_{1,i}$$
$$= T_{2,i} - (1 + \alpha)T_{1,i}$$

and $$\tilde{Y}_i = Y_i + \alpha T_{4,i},$$
$$= (1 + \alpha)T_{4,i} - T_{3,i}$$

wherein:
$\alpha$ is the estimated clock skew;
$T_{1,i}$ is the timestamp applied by the time server to the ith Sync message in the observation window;
$T_{2,i}$ is the time of receipt as recorded by the local clock on receipt of the ith Sync message;
$T_{3,i}$ is the timestamp applied by the time client to the ith Delay_Req message; and
$T_{4,i}$ is the time of receipt as recorded by the master clock on receipt of the ith Delay_Req message.

16. The method according to claim 15 wherein the step of selecting selects the representative delay values as the minimum values of $\tilde{X}_i$ and $\tilde{Y}_i$ from within the observation window.

17. The method according to claim 16 wherein the clock offset is estimated as:

$$\theta = \frac{\tilde{X}_{set} - \tilde{Y}_{set}}{2}$$

wherein:

$$\tilde{X}_{set} = \min_{1 \le i \le L} \tilde{X}_i$$

and $$\tilde{Y}_{set} = \min_{1 \le i \le L} \tilde{Y}_i.$$

18. The method according to claim 15 further including repeatedly performing the steps of transmitting, receiving, estimating and adjusting on a periodic basis.

19. A networked time system including a time server and at least one time client connected to the time server over a network, wherein:
the time server includes a master clock and a server control unit and transmits messages carrying timestamps from the master clock;
the time client includes a local clock and a client control unit and transmits messages carrying timestamps from the local clock,
wherein:
the server control unit is arranged to receive the messages from the time client and to extract the timestamps from said messages; and
the client control unit is arranged to:
receive the messages from the time server and to extract the timestamps from said messages;
estimate the skew and offset of the local clock compared to the master clock; and
adjust the output of the local clock using said estimated skew and offset,
the client control unit being arranged to estimate the skew and offset of the local clock by:
estimating the clock skew from the extracted timestamps over a predetermined observation period;
calculating a plurality of delay observations for each message exchange between the time server and the time client in the observation period;
determining, from said series of delay observations, one or more representative delay values for the observation window; and
estimating the clock offset from the selected representative delay values; and
wherein the messages are IEEE 1588 PTP messages;
wherein the messages transmitted from the time server include IEEE 1588 Sync messages, and the messages transmitted from the time client include IEEE 1588 Delay_Req messages; and wherein the delay observations are, over the observation window defined by $1 \leq i \leq L$:

$$\tilde{X}_i = X_i - \alpha T_{1,i}$$
$$= T_{2,i} - (1+\alpha)T_{1,i}$$

and $$\tilde{Y}_i = Y_i + \alpha T_{4,i},$$
$$= (1+\alpha)T_{4,i} - T_{3,i}$$

wherein:

$\alpha$ is the estimated clock skew;

$T_{1,i}$ is the timestamp applied by the time server to the ith Sync message in the observation window;

$T_{2,i}$ is the time of receipt as recorded by the local clock on receipt of the ith Sync message;

$T_{3,i}$ is the timestamp applied by the time client to the ith Delay_Req message; and $T_{4,i}$ is the time of receipt as recorded by the master clock on receipt of the ith Delay_Req message.

20. The networked time system according to claim 19 wherein the client control unit selects the representative delay values as the minimum values of $\tilde{X}_i$ and $\tilde{Y}_i$ from within the observation window.

21. The networked time system according to claim 20 wherein the clock offset is estimated as:

$$\theta = \frac{\tilde{X}_{set} - \tilde{Y}_{set}}{2}$$

wherein:

$$\tilde{X}_{set} = \min_{1 \leq i \leq L} \tilde{X}_i$$

and $$\tilde{Y}_{set} = \min_{1 \leq i \leq L} \tilde{Y}_i.$$

22. The networked time system according to claim 19 wherein the local control unit is arranged to adjust the output of the local clock on a periodic basis.

23. The networked time system according to claim 19 wherein the local clock includes a free-running oscillator which supplies pulses to a free-running counter.

24. A time client communicably coupled to a time server having a master clock over a network, the time client comprising:

a local clock; and a control unit, wherein the control unit is arranged to:

receive messages carrying timestamps from the time server and to extract the timestamps from said messages;

estimate the skew and offset of the local clock compared to the master clock; and adjust the output of the local clock using said estimated skew and offset, the control unit being arranged to estimate the skew and offset of the local clock by:

estimating the clock skew from the extracted timestamps over a predetermined observation period;

calculating a plurality of delay observations for each message exchange between the time server and the time client in the observation period;

determining, from said series of delay observations, one or more representative delay values for the observation window; and estimating the clock offset from the selected representative delay values; and wherein the messages are IEEE 1588 PTP messages;

wherein the messages transmitted from the time server include IEEE 1588 Sync messages, and the control unit is arranged to transmit IEEE 1588 Delay_Req messages to the time server; and wherein the delay observations are, over the observation window defined by $1 \leq i \leq L$:

$$\tilde{X}_i = X_i - \alpha T_{1,i}$$
$$= T_{2,i} - (1+\alpha)T_{1,i}$$

and $$\tilde{Y}_i = Y_i + \alpha T_{4,i},$$
$$= (1+\alpha)T_{4,i} - T_{3,i}$$

wherein:

$\alpha$ is the estimated clock skew;

$T_{1,i}$ is the timestamp applied by the time server to the ith Sync message in the observation window;

$T_{2,i}$ is the time of receipt as recorded by the local clock on receipt of the ith Sync message;

$T_{3,i}$ is the timestamp applied by the time client to the ith Delay_Req message; and $T_{4,i}$ is the time of receipt as recorded by the master clock on receipt of the ith Delay_Req message.

25. The time client according to claim 24 wherein the control unit selects the representative delay values as the minimum values of $\tilde{X}_i$ and $\tilde{Y}_i$ from within the observation window.

26. The time client according to claim 25 wherein the clock offset is estimated as:

$$\theta = \frac{\tilde{X}_{set} - \tilde{Y}_{set}}{2}$$

wherein:

$$\tilde{X}_{set} = \min_{1 \leq i \leq L} \tilde{X}_i$$

and $$\tilde{Y}_{set} = \min_{1 \leq i \leq L} \tilde{Y}_i.$$

27. The time client according to claim 24 wherein the local control unit is arranged to adjust the output of the local clock on a periodic basis.

28. The time client according to claim 24 wherein the local clock includes a free-running oscillator which supplies pulses to a free-running counter.

* * * * *